May 18, 1948.  R. E. FELL  2,441,805
FUEL CONTROL
Filed May 2, 1942  2 Sheets-Sheet 2
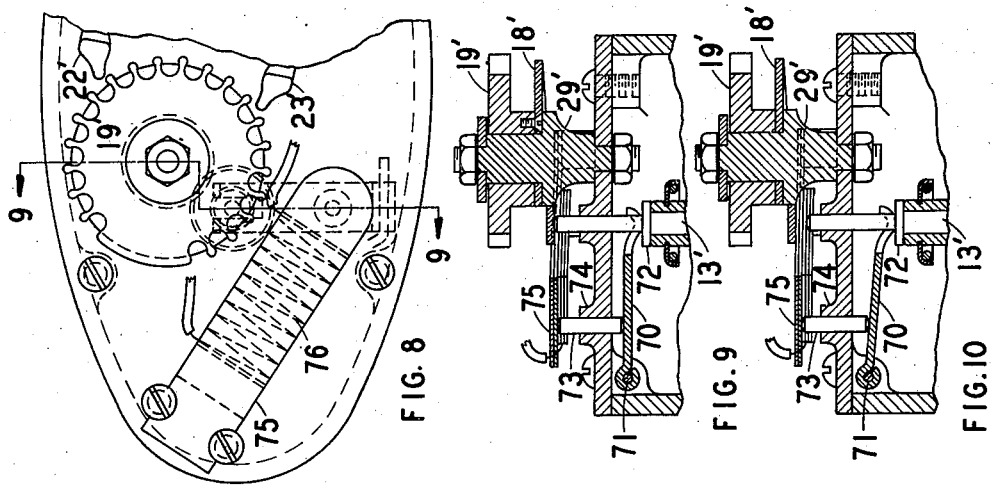
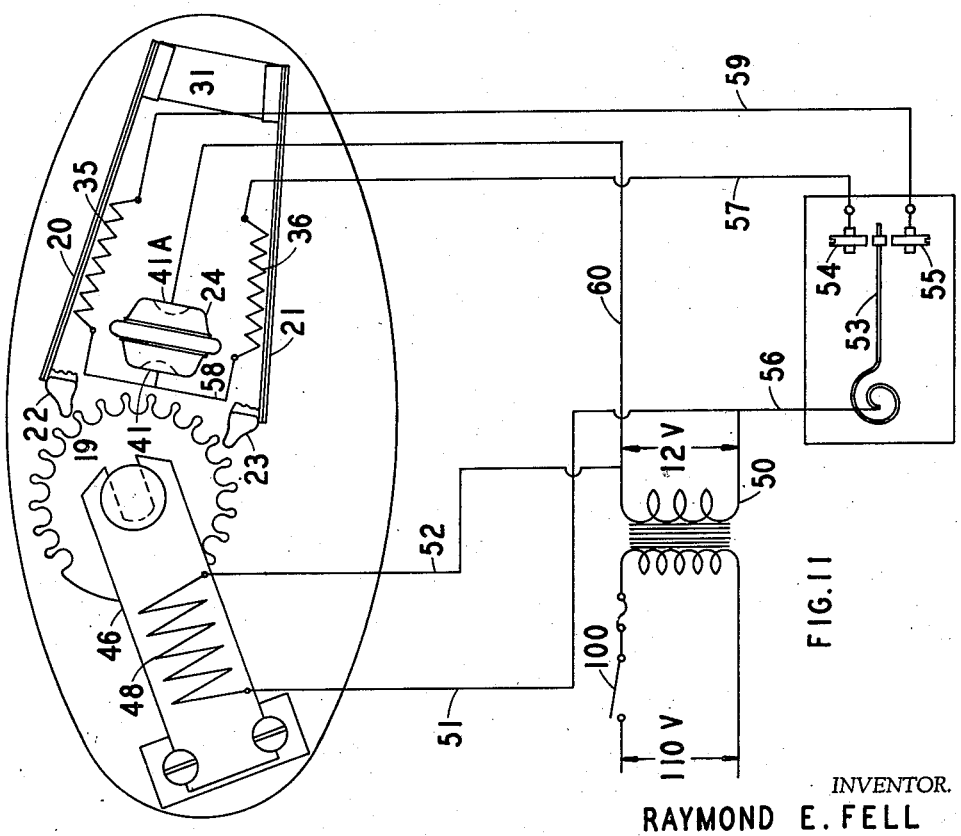
INVENTOR.
RAYMOND E. FELL
BY
Carroll R. Taber Patented May 18, 1948

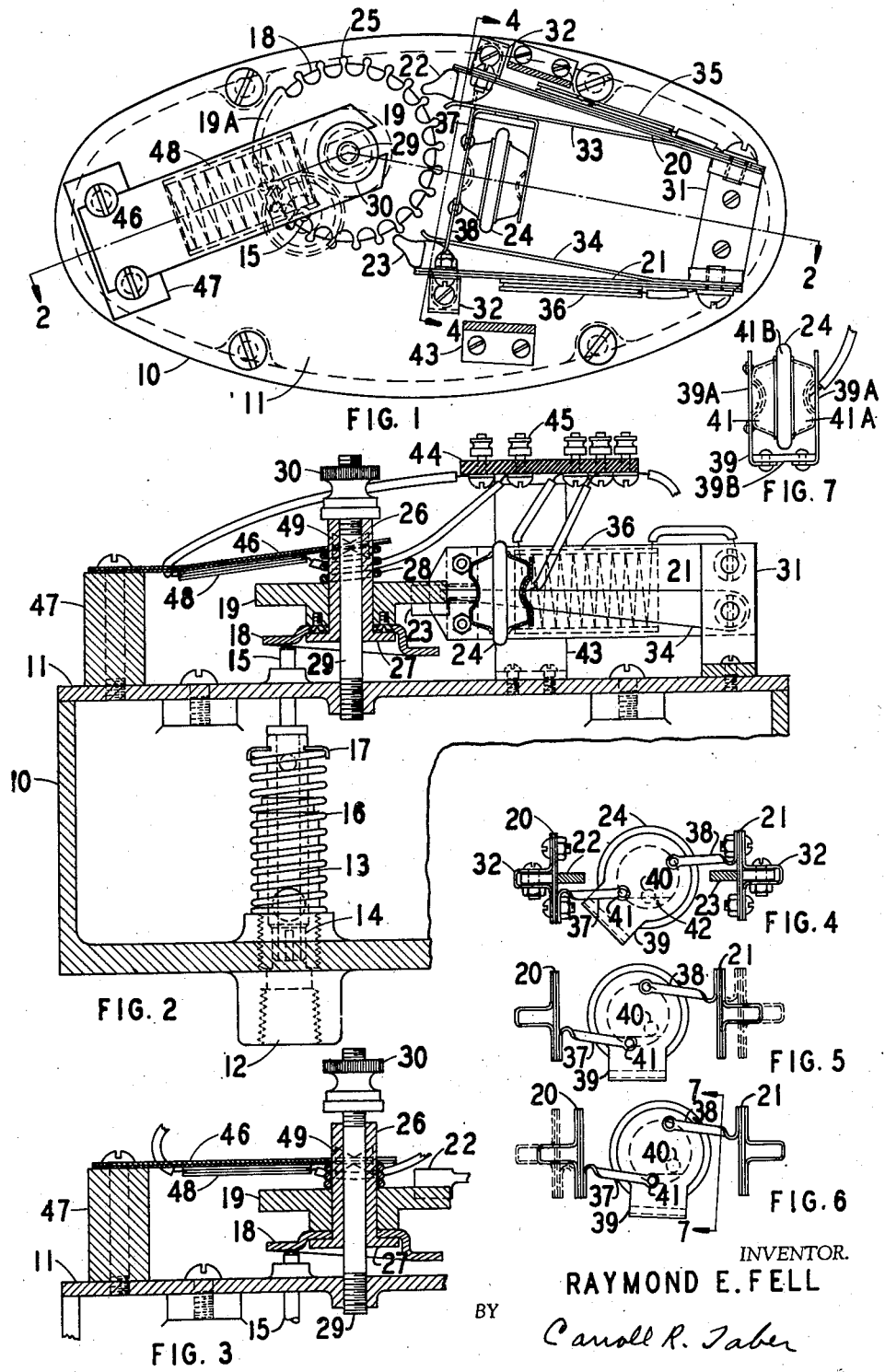

2,441,805

UNITED STATES PATENT OFFICE 2,441,805

FUEL CONTROL

Raymond E. Fell, Lansing, Mich., assignor to Motor Wheel Corporation, Lansing, Mich., a corporation of Michigan Application May 2, 1942, Serial No. 441,446

1 Claim. (Cl. 236—68)

This invention relates to automatic fuel controls for oil burners. More particularly the invention relates to that type of fuel control wherein the flow of fuel can be increased or decreased in increments of predetermined magnitude.

The principal object of the invention is to provide a simple, compact and efficient remote control mechanism for accurately adjusting step-by-step the degree of opening of a fuel regulating valve.

A further object of the invention is the provision of a simple and efficient safety mechanism for shutting off the flow of fuel under certain conditions.

A still further object is the provision of a novel self-timing step-by-step mechanism for imparting intermittent motion to a rotary member such as a fuel valve operating cam.

For a more thorough understanding of the invention, reference is made to the following description and the accompanying drawings, wherein—

Figure 1 is a top plan view of a fuel control embodying the invention, a portion thereof being removed to show the construction;

Figure 2 is a fragmentary cross-sectional view taken on substantially the line 2—2 of Figure 1;

Figure 3 is a fragmentary cross-sectional view of a portion of the structure shown in Figure 2, showing the parts in a different position than that shown in Figure 2;

Figures 4, 5 and 6 are respectively fragmentary views of a heat motor control switch in its three different operating positions taken on substantially the line 4—4 of Figure 1;

Figure 7 is a cross-sectional view taken on substantially the line 7—7 of Figure 6;

Figure 8 is a fragmentary top plan view of a modified form of the invention;

Figure 9 is a fragmentary cross-sectional view taken on substantially the line 9—9 of Figure 8;

Figure 10 is a cross-sectional view similar to Figure 9 showing the parts in another position; and Figure 11 is a wiring diagram of the invention.

In general, the invention comprises a unitary structure embodying a remotely controlled electrical step-by-step fuel valve adjusting mechanism, and an electric safety mechanism for shutting off the flow of fuel if for any reason the supply of electricity is interrupted.

The invention is shown in the drawings as a unitary construction attachable to a more or less conventional fuel regulator in place of the usual top wall thereof. The fuel regulator comprises a housing 10 having integral side and bottom walls and a removable top wall 11 which constitutes the base or support for the valve adjusting and safety mechanism. The housing is adapted to contain fuel oil which is conveyed thereto from a suitable source of supply. The fuel is maintained at a definite level in the housing by means of a float valve or barometric tank, not shown. In the bottom wall of the housing is an internally threaded outlet opening 12 adapted to receive a conduit for conveying fuel from the housing to an oil burner.

A fuel valve 13 is vertically reciprocable in a valve seat 14 threaded into the outlet opening 12. The valve has a stem 15 which projects through an opening in the top wall 11. A coil spring 16 surrounds the valve stem and is held between the bottom wall of the housing and a pin 17 fixed to the valve stem. The valve opens upwardly and closes downwardly, and is biased toward open position by the spring 16.

Mounted on the top wall 11 is the valve adjusting mechanism, which in general comprises a valve adjusting cam 18, a ratchet wheel 19 fixed thereto, two oscillatory heat motors 20 and 21 carrying pawls 22 and 23 for turning the ratchet wheel in either direction, and a switch 24 operated by and controlling the two heat motors.

The valve adjusting cam 18 is rigidly attached by screws to the ratchet wheel 19. The rim of the cam is mounted directly over the upper end of the valve stem 15. The ratchet wheel 19 has a plurality of teeth 25 extending around the major part but not all of its periphery. A small section 19a without teeth is thus provided for a purpose which will presently appear. The cam and ratchet wheel are rotatably mounted on a sleeve 26 having a flange 27 at its lower end. The cam and ratchet wheel are normally held against the flange 27 by a coil spring 28 surrounding the sleeve. The spring 28 is somewhat stiffer than the spring 16 around the valve 13.

The sleeve is slidably but non-rotatably mounted on a shaft 29 threaded into the top wall 11 of the housing 10. The upper end of the shaft is threaded to receive an adjustable stop nut 30 which limits the upward movement of the sleeve. When the control is in operation, the sleeve 26 is held in its upper position (see Figure 2) by the safety mechanism, in the manner to be described presently.

The ratchet wheel 19 is rotated in one direction or the other by the two electrically heated heat motors 20 and 21 mentioned above. These heat motors are substantially parallel bimetal arms having their outer ends rigidly mounted on a U-shaped bracket 31 which is secured to the top wall 11 of the housing. The two motors 20 and 21 are arranged so that when heated the motor 20 rotates counter-clockwise and motor 21 rotates clockwise. The pawls 22 and 23 are pivotally mounted in yokes 32 (see Figures 1 and 4) mounted on the free ends of the motors 20 and 21. Normally the pawls are held in the positions shown in Figure 1 by a pair of leaf springs 33 and 34 attached to the U-shaped bracket 31. That is, the pawls are held against the free ends of the motors 20 and 21 so that they cannot rotate clockwise and counter-clockwise, respectively. They can rotate in the opposite directions against the action of the springs 33 and 34.

Electrically insulated from the motors 20 and 21, but in heat exchange relation therewith, are two electric heating coils 35 and 36. These coils furnish heat to the motors under circumstances to be described later, and cause the motors to oscillate.

Two short switch supports 37 and 38 are rigidly attached at their remote ends to the free ends of the motors 20 and 21 respectively (see Figure 4). The supports 37 and 38 are flexible to permit some bending thereof vertically about their fixed ends. The inner free ends of the supports are pivotally attached at two spaced points to a U-shaped cradle 39 carrying the mercury switch 24 (see Figures 4 and 7 especially). The cradle 39 comprises two L-shaped metallic terminals 39a connected together by a strip of electrical insulating material 39b.

The switch 24 comprises a sealed hollow casing containing a globule of mercury 42. The casing consists of two cup shaped metallic contacts 41 and 41a having their open ends secured to a glass disk 41b which insulates the contacts 41 and 41a from each other. The glass disk 41b has a duct 40 extending through it through which the mercury 42 can flow. The contacts 41 and 41a are in electrical contact with the terminals 39a. The switch 24 is arranged so that when it is in its normal position, as shown in Figure 4, the mercury touches both contacts 41 and 41a and connects them through the duct 40. When the cradle 39 and switch 24 are rotated slightly counter-clockwise, as will appear more fully later, the duct 40 moves out of the mercury, breaking the latter into two separate globules, and disconnecting the contacts 41 and 41a (see Figures 5 and 6).

A pair of legs 43 are mounted on the top wall 11 and carry a terminal plate 44 of insulating material. The terminal plate is shown only in Figure 2, having been removed from Figure 1 to disclose the parts beneath it. The upper ends of the legs 43 have been cut away in Figure 2 also. A plurality of terminal screws 45 are attached to the plate 44 and are electrically connected to the various parts so that the entire unit can be easily connected to a thermostat and a source of current.

The safety fuel cut-off mechanism above mentioned comprises another heat motor 46. The heat motor consists of a bi-metallic arm fixed at its outer end to a support 47 on the top wall 11 of the housing, and an electric heating coil 48 in heat exchange relation with the motor. The inner, or free end of the motor is bifurcated to receive the sleeve 26 (see Figure 1) and is mounted in notches 49 in the sides of the sleeve. The heat motor is so arranged that when heated it bends upwardly and takes up the position shown in Figure 2, raising the sleeve against the stop nut 30. When the heat motor cools it bends downwardly into the position shown in Figure 3 and moves the sleeve downwardly also.

The electrical hook-up of the various parts is shown in Figure 11. The source of electric current for the control preferably is the 12 volt secondary 50 of a step-down transformer connected to the usual 110 volt lighting circuit. A line switch 100 controls the flow of current to the transformer. The coil 48 of the safety mechanism is connected by conductors 51 and 52 directly across the secondary of the transformer. A master switch, preferably in the form of a thermostat having a bimetal arm 53 and two spaced contacts 54 and 55, is located in a convenient place in the space to be heated. The bimetal strip of the thermostat is connected by conductor 56 to one terminal of the secondary 50 of the transformer. The contact 54 of the thermostat is connected by conductor 57 to the heating coil 36 for the heat motor 21. The other end of the coil 36 is connected by conductor 58 to terminal 41 of the switch 24. The contact 55 of the thermostat is connected by conductor 59 to coil 35 of heat motor 20, and the coil is in turn connected to contact 41 of the switch 24. The other contact 41a of the switch 24 is connected by conductor 60 to the secondary 50 of the transformer.

The operation of the device is as follows:

The thermostat 53 is adjusted to maintain a predetermined temperature in the space to be heated. The valve 13 is adjusted so that it cannot be completely closed, but a slight amount of oil is fed to the burner to maintain a pilot fire, and the fire is lighted. When the line switch 100 is closed electric current flows through the coil 48 of the safety mechanism and heats the heat motor 46, causing it to bend upwardly into the position shown in Figure 2, and raises the sleeve 26 to its uppermost position. This permits the valve stem 15 to rise to an open position governed by the position of cam 18. Depending upon the setting of the cam at that time, the burner may or may not operate at a capacity above that of the pilot fire. If at that setting of the valve 13 the burner does not furnish enough heat to maintain the temperature for which the thermostat 53 is set, the thermostat bends and touches contact 54, closing the circuit of the heating coil 36. Energization of the coil 36 heats the heat motor 21 and causes it to bend clockwise (see Figure 11). The pawl 23 then engages a tooth of the ratchet wheel and moves the ratchet wheel counter-clockwise a distance equal to one tooth of the wheel. As the heat motor bends, it carries with it the arm 38 (see Figure 4), and pivots the cradle 39 and switch 24 about its pivot connection with arm 37, eventually breaking the circuit by moving the duct 40 out of the mercury. This movement is illustrated diagrammatically by the change from the position shown in Figure 4 to the position shown in Figure 5. As soon as the circuit of coil 36 is broken in this manner the coil 36 and motor 21 are permitted to cool, whereby the motor 21 bends back to its original position. The pawl 23 is permitted to pivot against the action of the spring 34 and snap by the tooth in rear of the pawl, so that the entire operation can be repeated. The switch 24 is returned to the position of Figure 4 also when the motor 21 cools.

It will be obvious that the heating and cooling of the heat motor 21 takes some time. By suitable choice of materials and dimensions of the motor 21, the time for the complete cycle of movement can be easily determined. Ordinarily the cycle is adjusted to take about one minute.

Movement of the ratchet wheel in the manner described causes a corresponding movement of the cam 18 and permits the valve 13 to open slightly, admitting more oil to the burner and increasing the rate of combustion. If the increased rate of combustion is not sufficient to bring the room up to the proper temperature, the thermostat switch 53 remains closed and the cycle of operation of the motor 21 is repeated intermittently until such time as the proper temperature in the room is reached, or until the valve 13 reaches its open wide position. When the proper temperature is reached the thermostat 53 bends away from the contact 54 into its neutral position shown at Figure 11, and all movement of the fuel valve adjusting mechanism is stopped. If the cam and ratchet wheel have been moved to a position permitting the valve 13 to attain a wide open position, the toothless part 19a of the ratchet wheel will have reached a point where the pawl 23 will strike it instead of a tooth. Further movement of the ratchet wheel is thus prevented. If some means were not provided to stop the ratchet wheel, it would continue to rotate and cause the cam to abruptly close the valve 13.

If the temperature of the room continues to rise the thermostat arm 53 bends to touch the contact 55 and close the circuit of the heating coil 35. This results in a movement of the heat motor in a manner similar to that described in connection with motor 21 except that the heat motor 20 operates counter-clockwise when heated, to move the ratchet wheel and cam clockwise and close the valve 13. The movement of the heat motor 20 is illustrated in the change from Figure 4 to Figure 6. The switch 24, of course, is rotated by the arm 37 in the same direction as it is rotated when the arm 38 is moved.

Thus, it will be seen that the system above described opens or closes the fuel regulating valve to maintain reasonably even temperature within the space to be heated. The heat motors which provide the motive power for the ratchet wheel are their own timing mechanism, thus eliminating the need for a separate clock arrangement.

If for any reason the current for operating the heat motors 20 and 21 should be interrupted while while the burner is operating above pilot fire, the safety mechanism becomes operative so as to prevent continued operation of the burner at that level. As will be evident from Figure 11, the heat motor 46 is connected to the same source of current as the heat motors 20 and 21, so that if that current is interrupted the coil 48 is de-energized and the heat motor 46 cools. When it cools, it bends downwardly into the position shown in Figure 3, forcing the sleeve downwardly. Since the spring 28 is stiffer than spring 16, when the sleeve moves down, the cam 18 pushes the valve 13 to its closed position, as shown in Figure 3, and maintains the valve closed until the supply of current is resumed. The valve, of course, is not necessarily completely closed, but is lowered only to its adjusted pilot fire position. When the current supply is resumed, the heat motor 46 permits the valve 13 to open to the position at which it has been set by the valve adjusting mechanism prior to interruption of the current.

Figures 8, 9 and 10 illustrate a slightly modified form of the safety mechanism. In this form of the invention the fuel valve 13' is the same as the valve 13, but instead of the heat motor of the safety mechanism operating directly on the valve 13 it operates through a system of arms and plungers.

The cam 18' and ratchet wheel 19' are rotatably mounted directly on a shaft 29' fastened to the top wall of the housing. The rim of the cam 18' overlies the upper end of the valve 13' and moves it up and down in the manner described in connection with the device shown in Figures 1 to 7. The mechanism for rotating the ratchet wheel and cam is the same as that shown in Figures 1 to 7.

An arm 70 is pivoted at 71 on the housing. The free end of the arm 70 is bifurcated and straddles the fuel valve 13' resting upon a stop 72 on the valve. A plunger 73 extends through an opening in a boss 74 on the top wall of the housing and rests upon the arm 70 intermediate its ends. A heat motor 75 consisting of a bimetallic arm and having a heating coil 76, somewhat similar to the heat motor 46, is attached to a support on the top wall of the housing. The free end of the heat motor engages the upper end of the plunger 73. When the heat motor is energized in the same manner as the heat motor 46, it bends upwardly into the position shown in Figure 9 and permits the valve 13' to open. If the current is interrupted the heat motor cools and drives the plunger 73 downwardly, forcing the arm 70 to push the valve 13' to its pilot fire position. (See Figure 10.)

From the foregoing description it will be apparent that this invention provides a compact remotely controlled automatic means for adjusting a fuel regulating valve. The entire device can be built as a unit in conjunction with a base which replaces the top wall of the fuel control housing and is attached thereto as a unit. The device incorporates its own timing mechanism as an inherent feature of the particular type of heat motors used.

The scope of the invention is indicated in the appended claim.

I claim:

Mechanism for imparting intermittent rotary movement in either direction to a rotary member consisting of a ratchet wheel fixed to said member, a pair of oscillatory electric heat motors having relatively slow cycles of oscillation, said heat motors comprising a pair of substantially parallel laminated metal heat responsive arms having their ends remote from said ratchet wheel in fixed relation thereto and their free ends adjacent said ratchet wheel, a pawl mounted on the free end of each arm and selectively engageable with successive teeth on said ratchet wheel, an electric heating coil in heat exchange relation to each arm, a circuit for each coil including a common switch connected to said arms, and a thermostat having two spaced contacts, one connected to each of said coils, said thermostat being movable from one to the other of said contacts, said switch being arranged with respect to each of said arms whereby predetermined movement of either arm in a direction toward the other arm opens said switch and predetermined movement of either arm in a direction away from the other arm closes said switch.

RAYMOND E. FELL.

REFERENCES CITED

The following references are of record in the file of this patent:

UNITED STATES PATENTS

| Number | Name | Date |
|---|---|---|
| 1,881,884 | Noble | Oct. 11, 1932 |
| 2,021,413 | Gille | Nov. 19, 1935 |
| 2,028,571 | Smulski | Jan. 21, 1936 |
| 2,164,511 | Furlong | July 4, 1939 |
| 2,187,045 | McCorkle | Jan. 16, 1940 |
| 2,251,055 | Howard et al. | July 29, 1941 |
| 2,285,913 | Derrah | June 9, 1942 |
| 2,317,063 | Johnson | Apr. 20, 1943 |
| 2,329,820 | Breese | Sept. 21, 1943 |